March 25, 1924.
F. A. WERNIG
AUTOMOBILE BUMPER
Filed Jan. 23, 1922
1,487,772
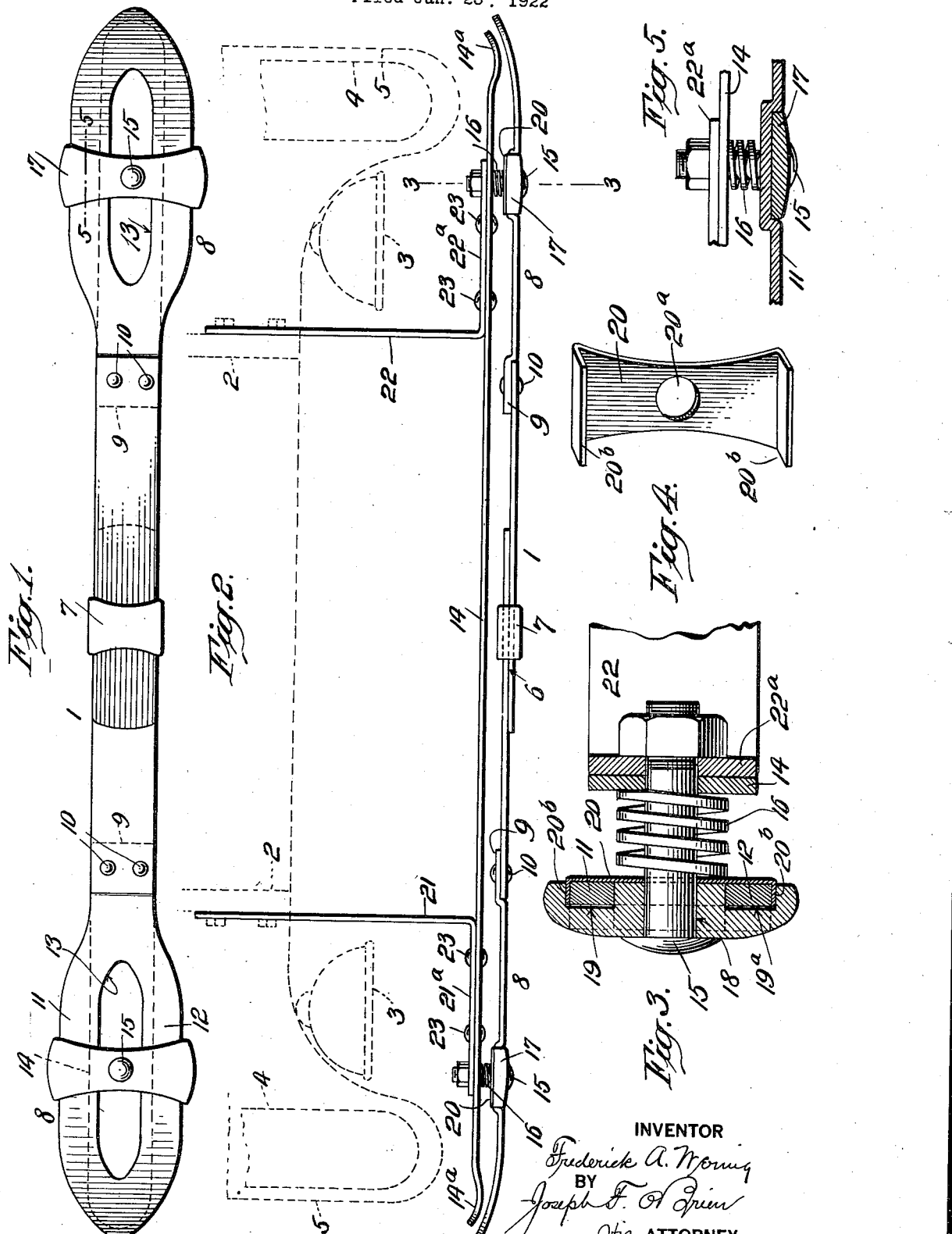
INVENTOR
Frederick A. Wernig
BY Joseph F. O'Brien
His ATTORNEY Patented Mar. 25, 1924.

1,487,772

UNITED STATES PATENT OFFICE.

FREDERICK A. WERNIG, OF BROOKLYN, NEW YORK.

AUTOMOBILE BUMPER.

Application filed January 23, 1922. Serial No. 531,082.

*To all whom it may concern:*

Be it known that I, FREDERICK A. WERNIG, a citizen of the United States, and a resident of the borough of Brooklyn, county of Kings and State of New York, have invented certain new and useful Improvements in Automobile Bumpers, of which the following is a specification.

This invention relates to automobile bumpers.

Spring-bar bumpers heretofore usually used on automobiles comprise either a bar or bars of uniform narrow width or impact area mounted transversely of the midplane of the car in a fixed vertical position at the front or rear end or else the impact area of the bumper is increased or expanded at the middle portion by extending the bars forming the bumper upwardly and downwardly at the middle of the bumper so as to provide parallel members spaced apart vertically and connected to a single narrow bar or strip comprising the 'end portions. In either case, an obstruction which projects above or below the narrow end portion of the bumper may avoid the bumper bar and damage the lamps and wheel fenders of an automobile and it is these portions of the automobile which are most frequently damaged.

The principal objects of this invention are to provide a bumper of increased vertical width at the opposite ends thereof so as to afford a greater degree of protection to the lamps and fenders of an automobile or other vehicle than bumpers heretofore provided; to produce a bumper composed of resilient bars or plates having an increased or expanded impact face at each end to more completely guard opposite side portions of a car to which it is attached and particularly the wheel fenders and lamps of such car; to produce a bumper having a middle portion of a predetermined uniform width and end portions comprising flat spring bars or plates of increased or expanded area, such end portions being preferably composed of resilient plates cut out at the central portion to lighten the construction and provide rim-strips spaced from each other at the central portion of the plate and connected together at opposite ends thereof; to produce a bumper in which the resilience of the bumper at such end portions of expanded or increased area will be enhanced by having the terminals of such ends free; to prevent rattling between such free ends of increased impact area and the contiguous parts thereof; to supplement the action of such flat springs at the free ends in taking up relatively light shocks and to resist and deaden the shocks of concussion in the transmission of relatively heavy shocks at such free ends; to produce a bumper in which a coiled spring is used in combination with free end portions of expanded or increased area to act as a buffer and anti-rattling device between resiliently movable terminal parts; to produce a bumper in which the bars and plates are so arranged that free ends of a rigid spring will be utilized to take up shocks of greater magnitude than can be taken up by the buffer coil spring; to produce a bumper in which the two parallel rim strips of the free end portion will be securely clamped together and will be acted upon conjointly by a single coil spring.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a front elevation of an automobile bumper embodying my invention;

Fig. 2 is a plan view of the bumper shown in Fig. 1;

Fig. 3 is a section on the line 3—3 of Fig. 2.

Fig. 4 is a perspective view of the rear web strip employed by me; and

Fig. 5 is a section on the line 5—5 of Fig. 3.

Referring now to these drawings, 1 indicates an impact bar preferably formed of spring material which, as shown, extends transversely across the automobile chassis or body members 2 and also across the lamps 3, wheels 4 and fenders 5 of the car. Said impact bar 1 comprises a middle portion 6 extending between the chassis or body members 2 of the car which is of relatively narrow vertical width and, as shown, is composed of two overlapping bar members adjustably connected together by a clamp 7; and end portions 8 of increased vertical width which extend outwardly from the middle portion in front of the lamps, fenders and wheels. As illustrated, each of such end portions comprises a resilient plate having an attaching portion 9 of a width similar to that of the middle bars and connected thereto by rivets 10 or in any other suitable manner and upper and lower expansion rim strips 11 and 12 which are forked from the attaching portion to extend upwardly and downwardly therefrom to produce an intermediate opening 13 so as to lighten the construction, such rim strips coming together at the outer end of a bumper to provide a free terminal therefor which is preferably curved inwardly. The end plates increase or expand the vertical width of the bumper at the opposite ends thereof and afford increased protection for the lamps and mud guards or fenders against bumps due to obstructions which extend above or below the middle bar and which would otherwise contact with such mud guards or wheel fenders and lamps of the automobile, and a light, strong and durable impact bar is provided which has increased area at the points at which increased protection is necessary and reduced impact area intermediate such points.

The impact bar 1 in the embodiment shown is resiliently supported at the end portions of increased area by supporting members including a spring bar 14 which extends substantially parallel to said impact bar, is spaced therefrom and preferably has its opposite ends 14ª curved to conform with the curved terminals of the impact bar for a purpose which will be hereinafter explained.

The impact bar is, in the embodiment shown, mounted on the bar 14 at such end portions of increased area by bolt connections 15 having coiled springs 16 under tension mounted thereon so as to cause a firm though resiliently-movable mounting of the impact bar on the rear bar 14. The connection 15 is preferably made, as illustrated, with a clamp 17 which spans the opening between the rim strip members 11 and 12 and is provided with a central bore 18 for the bolt 15 and has on its inner surface seats 19—19ª into which are fitted the rim strips 11 and 12. The rim strips are preferably more securely held within the seats 19—19ª by a web strip 20 which is provided with a bolt bore 20ª and has inwardly extending flanges 20ᵇ at its opposite ends which extend into the seats 19—19ª and when this strip 20 is backed up by the spring 16 the rim strips will be securely held within their seats in the clamp.

The bumper is preferably supported from the body of the car by oppositely disposed connecting arms 21—22 which are fastened in any suitable manner to the car body at one end and have bends 21ª—22ª disposed parallel with the spring bar 14 and fastened thereto by rivets 23. As illustrated, the bent portions 21ª—22ª extend outwardly and the connecting bolt 15 also passes therethrough so as to afford a firm foundation for the connection and to procure a more rigid support at this point.

It will be seen that I have provided an impact member formed of resilient material with increased area portions at opposite ends; that this impact member is resiliently supported at such end portions of increased area by the interpositioning of coiled springs and that when a shock is received at either of such end portions the same will be taken up first by the coiled spring, and if the shock is of such intensity as to collapse the coiled springs further strain on the impact bar will be taken up and resiliently resisted by the curved ends 14ª of the rear spring bar 14 and finally still greater strain will be taken up by the bar 14 itself as reinforced by the bent portions 21ª—22ª of the attaching arms 21—22.

Having described my invention, I claim:—

1. An automobile bumper comprising a rear supporting bar formed of spring material and having free ends; connecting arms engaging said supporting bar intermediate its ends for fastening the same to the automobile chassis; an impact member also formed of spring material having free ends and provided with horizontally-extending end portions of relatively large vertically-disposed impact area merging with a single-bar portion between such end portions of reduced impact area, and springs arranged between said supporting bar and said impact member to prevent rattling and take up shocks imposed on the impact member.

2. An automobile bumper comprising a supporting bar formed of spring material and having free ends, an impact member formed of spring material and also having free ends and provided with a central bar portion of relatively narrow impact area extending in front of the radiator of an automobile and portions of relatively widened impact area extending both above and below the horizontal plane of the middle portion of the impact bar and extending across the wheel fenders of a car, and springs arranged between the free ends of the supporting bar and impact bar to prevent rattling and take up strains imposed on said impact bar.

3. An automobile bumper comprising a supporting bar formed of spring material and having free ends, an impact member formed of spring material and also having free ends and provided with a central bar portion of relatively narrow impact area extending in front of the radiator of an automobile and portions of relatively widened impact area composed of spaced rim strips extending both above and below the horizontal plane of the middle portion of the impact bar and extending across the wheel fenders of a car, and coiled springs under tension arranged between the free ends of the supporting bar and impact bar to prevent rattling and take up strains imposed on said impact bar and clamps bridging said spaced rim strips against which said springs abut at one side.

4. An automobile bumper comprising a supporting bar formed of spring material and having free ends, an impact member formed of spring material and also having free ends and provided with a central bar portion of relatively narrow impact area extending in front of the radiator of an automobile and portions of relatively widened impact area composed of spaced rim strips extending both above and below the horizontal plane of the middle portion of the impact bar and extending across the wheel fenders of a car, coiled springs under tension arranged between the free ends of the supporting bar and impact bar to prevent rattling and take up strains imposed on said impact bar and clamps having seats into which are fitted said spaced rim strips and against which said springs abut at one side.

In witness whereof, I have signed my name to the foregoing specification in the presence of two subscribing witnesses.

FREDERICK A. WERNIG.

Witnesses:
  HELEN V. WHIDDEN,
  JULIUS H. LUTZ.